(12) United States Patent
Zhang et al.

(10) Patent No.: US 9,331,730 B2
(45) Date of Patent: May 3, 2016

(54) WIRELESS TERMINAL WITH REDUCED SAR PEAK VALUE AND METHOD FOR REDUCING SAR PEAK VALUE BY USING THE WIRELESS TERMINAL

(75) Inventors: Lu Zhang, Shenzhen (CN); Long Li, Shenzhen (CN); Yang Yang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/350,134

(22) PCT Filed: Feb. 21, 2012

(86) PCT No.: PCT/CN2012/071399
§ 371 (c)(1),
(2), (4) Date: Apr. 7, 2014

(87) PCT Pub. No.: WO2012/155568
PCT Pub. Date: Nov. 22, 2012

(65) Prior Publication Data
US 2015/0057053 A1    Feb. 26, 2015

(30) Foreign Application Priority Data
Oct. 12, 2011 (CN) .......................... 2011 1 0308427

(51) Int. Cl.
*H04M 1/00* (2006.01)
*H04B 1/3827* (2015.01)
(Continued)

(52) U.S. Cl.
CPC .......... *H04B 1/3838* (2013.01); *H01Q 1/2275* (2013.01); *H01Q 1/245* (2013.01); *H01Q 1/52* (2013.01); *H01Q 9/42* (2013.01); *H01Q 21/28* (2013.01)

(58) Field of Classification Search
USPC .......... 455/575.5, 575.7, 129, 13.3; 343/751, 343/853, 879, 893
See application file for complete search history.

(56) References Cited

U.S. PATENT DOCUMENTS 7,852,272 B2    12/2010 Imano et al.
2004/0214621 A1    10/2004 Ponce De Leon et al.
(Continued)

FOREIGN PATENT DOCUMENTS

CN    1909283 A    2/2007
CN    101286747 A    10/2008
(Continued)

OTHER PUBLICATIONS

Supplementary European Search Report in European application No. 12786348.8, mailed on Aug. 25, 2014.
(Continued)

*Primary Examiner* — Dominic E Rego
(74) *Attorney, Agent, or Firm* — Brundidge & Stanger, P.C.

(57) ABSTRACT

A wireless terminal with a reduced Specific Absorption Rate (SAR) peak value and a method for reducing an SAR peak value by using the wireless terminal are disclosed. The wireless terminal with a reduced SAR peak value includes a first antenna configured to receive or transmit a communication signal, and further includes: a second antenna configured to feed a coupling signal when the first antenna receives or transmits the communication signal, and a signal processing module configured to process the coupling signal to reduce an SAR peak value of the communication signal for a human body. The energy of a superposed signal in a human body orientation is reduced by superposing the coupling signal with the communication signal, so as to reduce the SAR peak value effectively.

7 Claims, 7 Drawing Sheets

(51) Int. Cl.
*H01Q 1/24* (2006.01)
*H01Q 1/22* (2006.01)
*H01Q 9/42* (2006.01)
*H01Q 21/28* (2006.01)
*H01Q 1/52* (2006.01)

(56) References Cited

U.S. PATENT DOCUMENTS

| | | | |
|---|---|---|---|
| 2004/0248523 A1* | 12/2004 | Nishimura et al. | 455/78 |
| 2006/0139216 A1* | 6/2006 | Glocker et al. | 343/702 |
| 2009/0102726 A1 | 4/2009 | Imano et al. | |
| 2010/0317302 A1* | 12/2010 | Greenwood et al. | 455/127.1 |
| 2011/0090126 A1 | 4/2011 | Szini et al. | |
| 2012/0142291 A1* | 6/2012 | Rath et al. | 455/127.1 |
| 2012/0147801 A1* | 6/2012 | Ho et al. | 370/311 |
| 2012/0164962 A1* | 6/2012 | Lin et al. | 455/127.1 |

FOREIGN PATENT DOCUMENTS

| | | |
|---|---|---|
| CN | 101552615 A | 10/2009 |
| CN | 101883413 A | 11/2010 |
| CN | 102089989 A | 6/2011 |
| CN | 102150326 A | 8/2011 |
| EP | 1923953 A1 | 5/2008 |
| JP | 2003283393 A | 10/2003 |
| JP | 4025103 B2 | 12/2007 |
| WO | 2007029741 A1 | 3/2007 |
| WO | 2010030128 A2 | 3/2010 |
| WO | 2011140787 A1 | 11/2011 |

OTHER PUBLICATIONS

International Search Report issued in corresponding application No. PCT/CN2012/071399 on Jul. 19, 2012.

International Publication issued in corresponding application No. PCT/CN2012/071399 on Nov. 22, 2012.

Written Opinion issued in corresponding application No. PCT/CN2012/071399 mailed on Jul. 19, 2012.

* cited by examiner

WIRELESS TERMINAL WITH REDUCED SAR PEAK VALUE AND METHOD FOR REDUCING SAR PEAK VALUE BY USING THE WIRELESS TERMINAL

TECHNICAL FIELD

The disclosure relates to the field of wireless communication, and in particular to a wireless terminal with a reduced Specific Absorption Rate (SAR) peak value and a method for reducing an SAR peak value by using the wireless terminal.

BACKGROUND OF THE INVENTION

With the rapid development of wireless communication technology, a wireless terminal such as a mobile terminal or a data card has been applied widely. Meanwhile, electromagnetic radiation effect of the wireless terminal on the human body has been gradually paid more attention. At present, an index measuring the electromagnetic radiation of an antenna to the human body is an SAR, which refers to a specific value of electromagnetic wave energy absorption of a wireless terminal. The meaning of the SAR is "electromagnetic energy absorbed by a unit mass of a biological tissue in a unit time", with the unit of W/kg or mW/g. The Federal Communication Commission (FCC) explicitly stipulates maximum allowable SARs of various wireless terminals when these wireless terminals interact with a human body, and stipulates that the SAR of a mobile-phone-type mobile terminal should be measured when the mobile terminal is close to one side of a human brain and that the SAR of data-card-type terminal must be measured on four human-body surfaces near the data card. Thus, it has become an important problem to be solved in the industry that the radiation to the human body is reduced effectively while communication quality and miniaturization portability of the wireless terminal are ensured.

While the radiation effect of the mobile terminal on the human body is considered, a reaction of the human body on the mobile terminal must also be considered since a proximity effect of the human body may cause reduction of communication quality. Generally, when the human body is close to the mobile terminal, the human body, as a lossy conducting medium, will significantly affect a radiation characteristic of a terminal antenna. The affection may specifically include mismatch of antenna feed ports, reduction of a total radiation power caused by human body absorption and the like. At present, a main method for solving a reaction effect of the human body on the mobile terminal is generally to counteract antenna mismatch due to the human body through a matching network. Although the method can reduce mismatch loss on a radio-frequency circuit, this may result in more electromagnetic energy entering into the human body and further increase the SAR peak value.

SUMMARY OF THE INVENTION

In view of the above, it is desired that the disclosure provides a wireless terminal with a reduced Specific Absorption Rate (SAR) peak value and a method for reducing an SAR peak value by using the wireless terminal, which can reduce the SAR peak value effectively.

A wireless terminal with a reduced SAR peak value is proposed, which includes a first antenna configured to receive or transmit a communication signal and further includes: a second antenna configured to feed a coupling signal when the first antenna receives or transmits the communication signal; and a signal processing module configured to process the coupling signal to reduce an SAR peak value of the communication signal for a human body.

In an embodiment, the signal processing module may be further configured to: adjust an amplitude and a phase of the coupling signal, so as to change an amplitude ratio and a phase difference between the coupling signal and the communication signal and to reduce energy of a near-field superposed signal of the coupling signal and the communication signal.

In an embodiment, the second antenna may include: a second feed source configured to feed the coupling signal; and a second radiator configured to receive or transmit the coupling signal.

In an embodiment, the second radiator may be a tortuous conducting line or a conducting strip with multiple branches.

In an embodiment, the wireless terminal with a reduced SAR peak value may further include a human body sensor configured to sense and output orientation information of the human body; wherein the signal processing module may be further configured to: receive the orientation information of the human body, determine, according to the orientation information of the human body and an amplitude and a phase of the communication signal, the amplitude and the phase of the coupling signal corresponding to a minimum value of the energy of the near-field superposed signal in the human body orientation, and adjust the coupling signal according to the determined amplitude and phase of the coupling signal.

In an embodiment, the human body sensor may be an optical sensor, a thermal sensor, a gravity sensor or a proximity sensor, and the human body sensor includes multiple human body sensors distributed on each inner surface of the wireless terminal.

In an embodiment, the second antenna may be further configured to feed the communication signal, and receive or transmit the communication signal.

A method for reducing an SAR peak value by using a wireless terminal is proposed, which includes: a coupling signal is fed when a communication signal is received or transmitted; and the coupling signal is processed to reduce an SAR peak value of the communication signal for a human body.

In an embodiment, the process that the coupling signal is processed to reduce the SAR peak value of the communication signal for the human body may include: an amplitude and a phase of the coupling signal are adjusted to change an amplitude ratio and a phase difference between the coupling signal and the communication signal and to reduce energy of a near-field superposed signal of the coupling signal and the communication signal.

In an embodiment, before the amplitude and the phase of the coupling signal are adjusted, the method may further include: orientation information of the human body is sensed; and the amplitude and the phase of the coupling signal corresponding to a minimum value of the energy of the near-field superposed signal in the human body orientation are determined according to the orientation information of the human body, and an amplitude and a phase of the communication signal.

In the disclosure, the energy of a superposed signal in a human body orientation is reduced by superposing the coupling signal with the communication signal, so as to reduce the SAR peak value effectively. A radiation near-field distribution of an antenna is changed to concentrate the radiation of the antenna in a non-human-body direction, so that a radiation gain of the antenna is improved and communication quality is thereby improved.

The implementation, functional characteristics and advantages of the disclosure will be further elaborated with reference to embodiments and the drawings.

DETAILED DESCRIPTION

It should be understood that specific embodiments described here are only used to explain the disclosure instead of limiting the disclosure.

Figure 1:
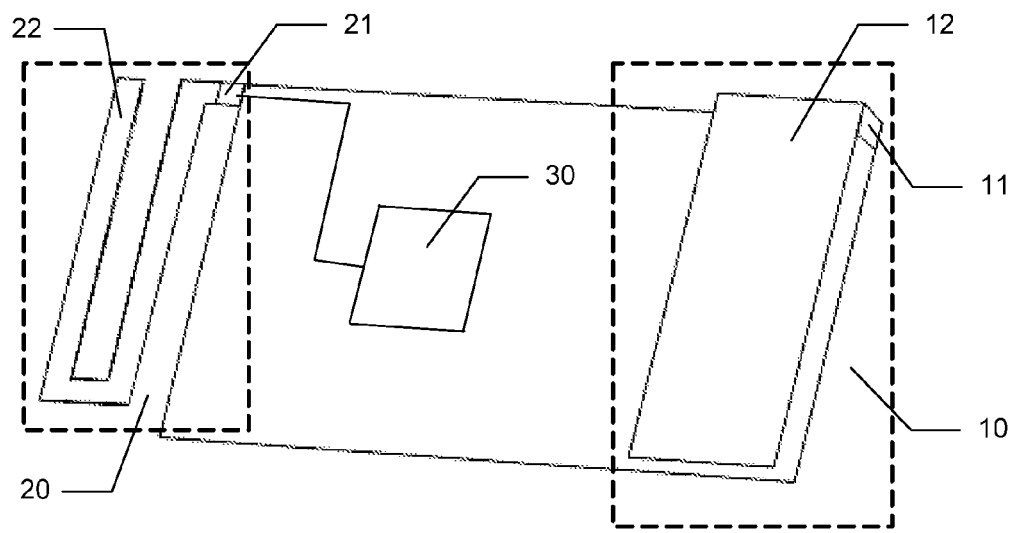
FIG. 1 is a schematic diagram of a structure of a wireless terminal with a reduced SAR peak value according to an embodiment of the disclosure.

As shown in FIG. 1, FIG. 1 is a schematic diagram of a structure of a wireless terminal with reduced SAR peak value according to an embodiment of the disclosure. The wireless terminal mentioned in the embodiment includes a first antenna 10 configured to receive or transmit a communication signal, and further includes: a second antenna 20 configured to feed a coupling signal when the first antenna receives or transmits the communication signal; and a signal processing module 30 configured to process the coupling signal to reduce an SAR peak value of the communication signal for a human body.

In the embodiment, both the first antenna 10 and the second antenna 20 are mounted on a printed circuit board of the wireless terminal, or are directly etched on the printed circuit board, and the first antenna 10 serves as an antenna for transmiting and receiving a communication signal while the second antenna 20 serves as an auxiliary antenna for reducing an SAR peak value. Due to the superposition of the coupling signal fed by the second antenna 20 and the communication signal received or transmitted by the first antenna 10, electromagnetic wave energy of the communication signal radiating to the human body is changed. The electromagnetic energy radiating to the human body can be minimized through processing the coupling signal by the signal processing module 30, so as to reduce the SAR peak value of electromagnetic radiation absorbed by the human body. In addition, the coupling signal is adjusted in the embodiment, on the one side, the SAR peak value is reduced near the orientation of the human body; on the other side, since the radiation near-field distribution of the antenna is changed, the radiation of the antenna is mainly concentrated in a non-human-body direction, thereby improving the radiation gain of the antenna and then improving the communication quality.

In an embodiment of the disclosure, the signal processing module 30 is further configured to: adjust an amplitude and a phase of a coupling signal, so as to change an amplitude ratio and a phase difference between the coupling signal and the communication signal and to reduce energy of a near-field superposed signal of the coupling signal and the communication signal.

In the embodiment, when the amplitude and the phase of the coupling signal are not consistent with those of the communication signal, the energy of the superposed signal in all orientations of the near field may be changed due to the superposition of the coupling signal and the communication signal. The amplitude and the phase of the coupling signal are adjusted by the signal processing module 30 to adjust the amplitude ratio and the phase difference between the coupling signal and the communication signal, and the amplitude ratio and the phase difference corresponding to a minimum value of the energy of the superposed signal in all orientations of the wireless terminal may be found. An appropriate amplitude ratio and an appropriate phase difference are selected according to a specific orientation of the human body close to the wireless terminal, in order to minimize the energy of the near-field superposed signal radiating to the human body in the orientation and then reduce the SAR peak value.

In an embodiment of the disclosure, the second antenna 20 specifically includes: a second feed source 21 configured to feed the coupling signal; and a second radiator 22 configured to receive or transmit the coupling signal.

In the embodiment, the first antenna 10 and the second antenna 20 both include respective feed source and radiator, namely, the first antenna 10 also includes a first feed source 11 and a first radiator 12. The first radiator 12 and the second radiator 22 are coupled to the printed circuit board through the first feed source 11 and the second feed source 21 respectively, or are directly etched on the printed circuit board. Meanwhile, the second antenna 20 may be selected as a monopole antenna with a quarter working wavelength. In order to save internal space of the wireless terminal, the second radiator 22 may be designed as a tortuous conducting line or a conducting strip with multiple branches. Reducing space occupation by the way of bending is helpful to the miniaturization of the wireless terminal.

In an embodiment of the disclosure, the second antenna 20 may be further configured to feed the communication signal, and receive or transmit the communication signal.

In the embodiment, because of the good performance of the first antenna 10, the first antenna 10 is taken as a main antenna and may be designed as the form of a monopole antenna or an Inverted-F Antenna (IFA) or a Planar Inverted-F Antenna (PIFA). In order to reduce the volume of the wireless terminal, the monopole antenna is generally selected. When the communication signal is weak, the second antenna 20 may be taken as an auxiliary antenna to receive or transmit the communication signal. In the embodiment, there is at least one second antenna 20. When multiple second antennas 20 are used cooperatively, one of the second antennas 20 is used to reduce the SAR peak value, and other second antennas 20 may be used to receive or transmit the communication signal to facilitate the improvement of the communication quality.

Figure 2:
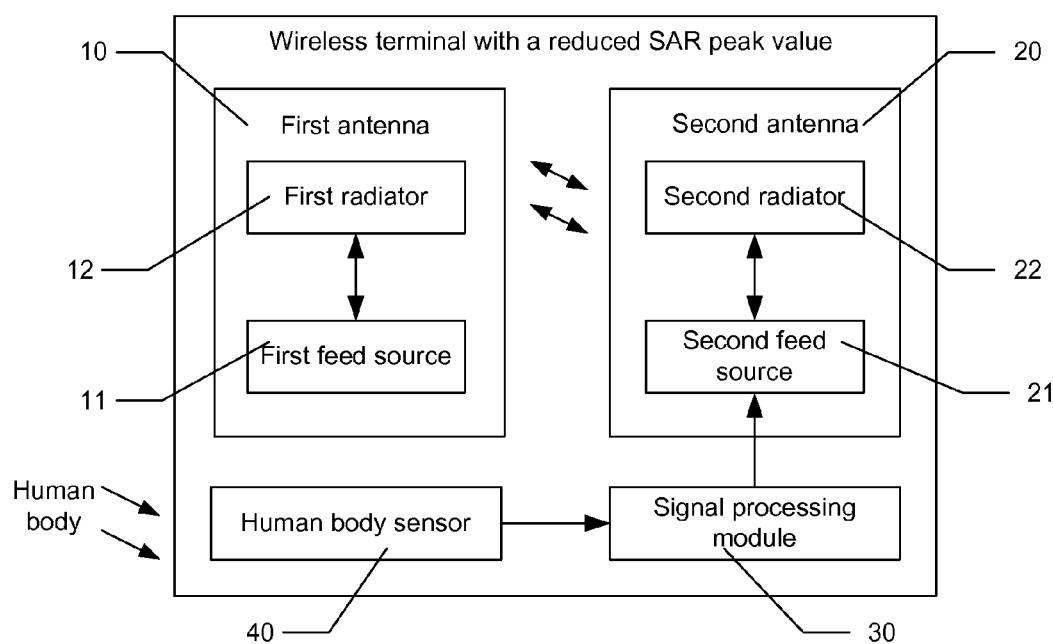
FIG. 2 is a schematic diagram of a structure of a wireless terminal with a reduced SAR peak value according to a further embodiment of the disclosure, and the embodiment includes a human body sensor.

As shown in FIG. 2, FIG. 2 is a schematic diagram of a structure of wireless terminal with a reduced SAR peak value in a further embodiment of the disclosure. The embodiment may further include: a human body sensor 40 configured to sense and output orientation information of the human body; wherein the signal processing module 30 is further configured to: receive the orientation information of the human body, determine, according to the orientation information of the human body and an amplitude and a phase of the communication signal, the amplitude and the phase of the coupling signal corresponding to a minimum value of the energy of the near-field superposed signal in the human body orientation, and adjust the coupling signal according to the determined amplitude and phase of the coupling signal.

The human body sensor 40 in the embodiment is an optical sensor, a thermal sensor, a gravity sensor or a proximity sensor. The human body sensor includes multiple human body sensors 40 in the embodiment, which are distributed on each inner surface of the wireless terminal. When the human body is close to one side of the wireless terminal, the human body sensor 40 on this side will output the orientation information of the human body for the signal processing module 30 to acquire a specific orientation of the human body with respect to the wireless terminal. The signal processing module 30 may determine, according to the current orientation information of the human body, the amplitude ratio and the phase difference between the coupling signal and the communication signal corresponding to a minimum value of the energy of the near-field superposed signal in the human body orientation, and determine the amplitude and the phase of the coupling signal through the amplitude and the phase of the communication signal, for the second feed source 21 to adjust the fed coupling signal. In the embodiment, the amplitude of the coupling signal may be adjusted by an adjustable amplifier or an attenuator, and the phase of the coupling signal may be adjusted by an adjustable phase shifter, so as to implement real-time dynamic adjustment of a radiation near-field and reduce the SAR value. In addition, in order to control cost, the energy of the near-field superposed signal in all orientations can be considered comprehensively through the previous measurement and calibration process, to acquire an appropriate amplitude ratio and phase difference. A fixed amplitude and phase of the coupling signal is preset on each feeding line, then the human body sensor 40 can be omitted in the wireless terminal, so that the number of components and parts is reduced, the cost is reduced while the internal space of the wireless terminal occupied by components and parts is reduced, so as to implement the miniaturization of the wireless terminal.

Figure 3:
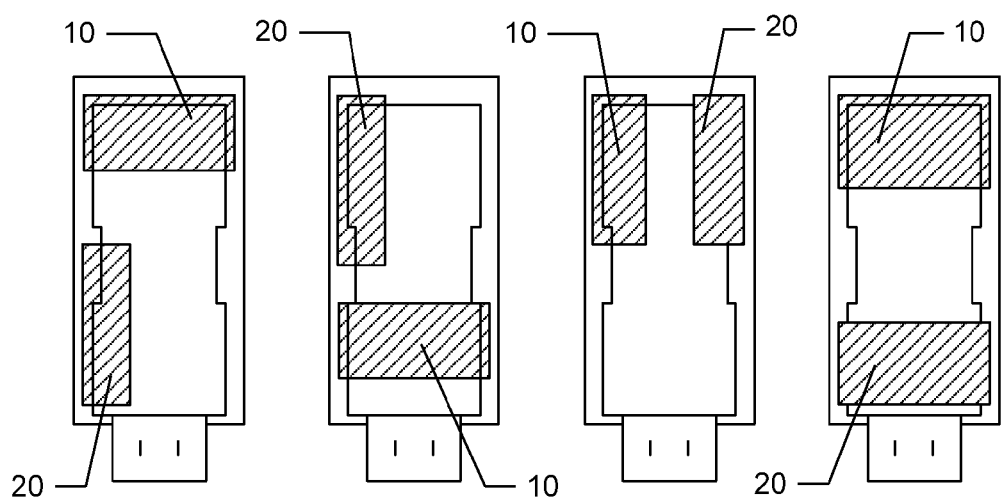
FIG. 3 is a schematic diagram of a structure of a wireless terminal with a reduced SAR peak value according to a further embodiment of the disclosure, and the embodiment includes four layouts of the wireless terminal.

As shown in FIG. 3, FIG. 3 is a schematic diagram of a structure of a wireless terminal with a reduced SAR peak value in a further embodiment of the disclosure. The embodiment includes four layouts of the wireless terminal. The four graphs from left to right in the figure are FIG. 3*a*, FIG. 3*b*, FIG. 3*c* and FIG. 3*d* respectively, without specific reference numbers.

The wireless terminal in the embodiment is a data-card-type wireless terminal, which usually adopts a cubiform shell and is connected to a laptop through a Universal Serial Bus (USB) connector. A first antenna 10 and a second antenna 20 are mounted on a printed circuit board inside the shell of the wireless terminal. FIG. 3*a*, FIG. 3*b*, FIG. 3*c* and FIG. 3*d* show four layouts respectively. As shown in FIG. 3*d*, the first antenna 10 and the second antenna 20 are symmetrically placed on the top of the circuit board, which occupy a similar area, thus the kind of layout is with the best balance.

Figure 4:
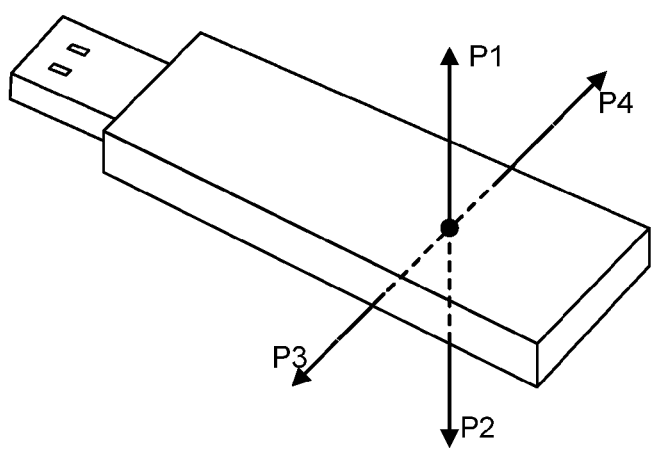
FIG. 4 is a schematic diagram of a structure of a wireless terminal with a reduced SAR peak value according to a further embodiment of the disclosure, and the embodiment includes an identifier of an observation surface of the SAR peak value.

As shown in FIG. 4, FIG. 4 is a schematic diagram of a structure of a wireless terminal with a reduced SAR peak value in a further embodiment of the disclosure. The embodiment includes an identifier of an observation surface of the SAR peak value.

The wireless terminal in the embodiment is a data-card-type wireless terminal. Due to the regulation of the Federal Communication Commission (FCC), the SAR peak values of the human body on four sides including up, down, left and right sides require at least to be measured for the data-card-type wireless terminal. Namely, in the directions of planes P1, P2, P3 and P4 shown in FIG. 4, the measuring distance is 5 mm. In certain special situations, the SAR value on the top of the data card needs also be measured, which is intended to consider all situations that the human body is radiated when being close to the data card in daily application scenarios.

As shown in FIG. 5, FIG. 5 is a tendency chart of the SAR peak value of the wireless terminal with a reduced SAR peak value shown in the FIG. 4.

Figure 5A:
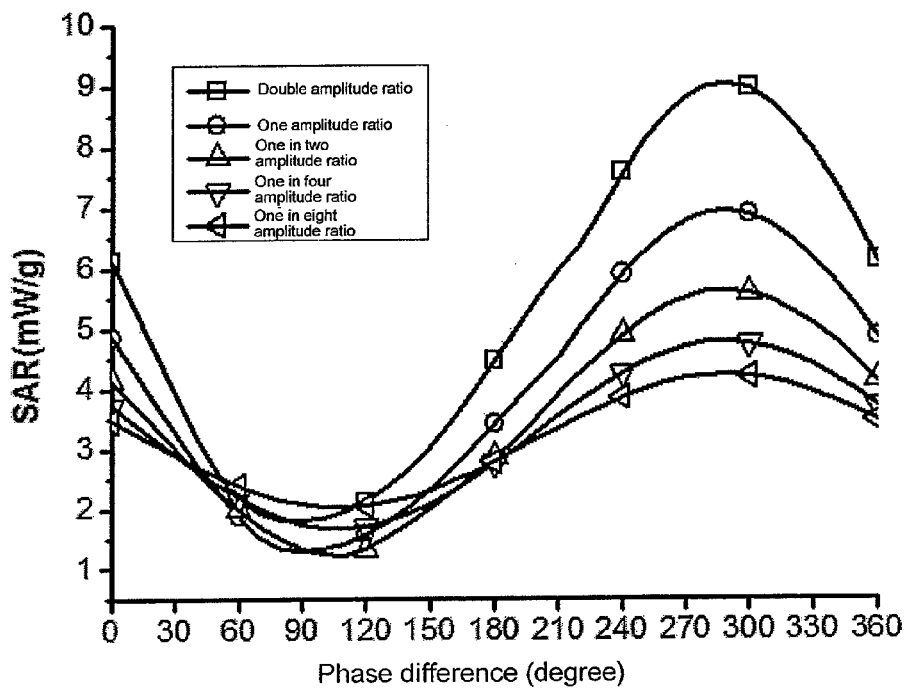
FIG. 5 is a tendency chart of the SAR peak value of the wireless terminal with a reduced SAR peak value shown in the FIG. 4.
Figure 5B:
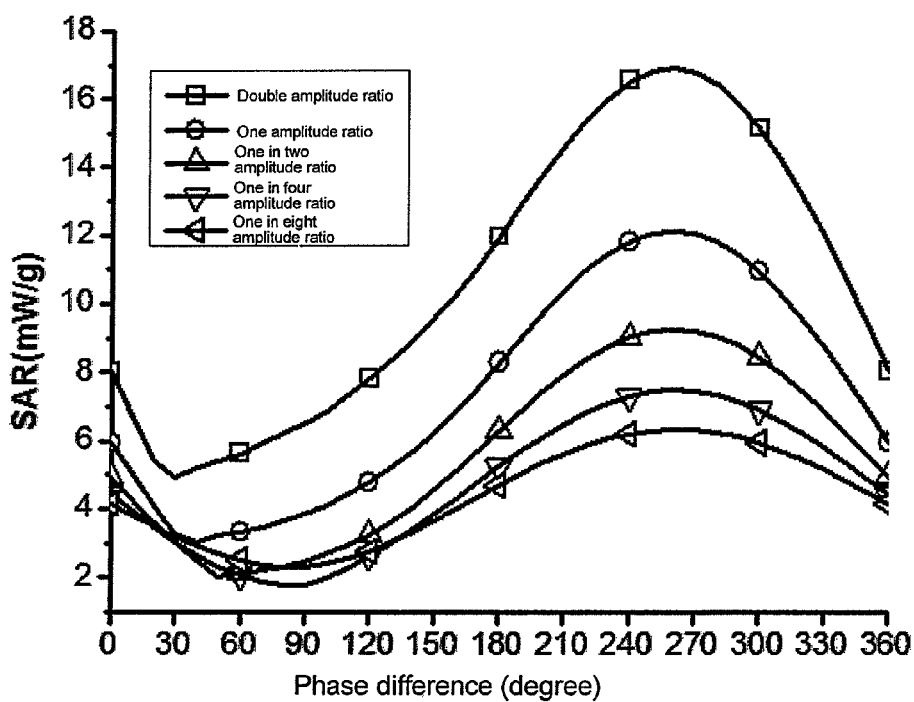
Figure 5C:
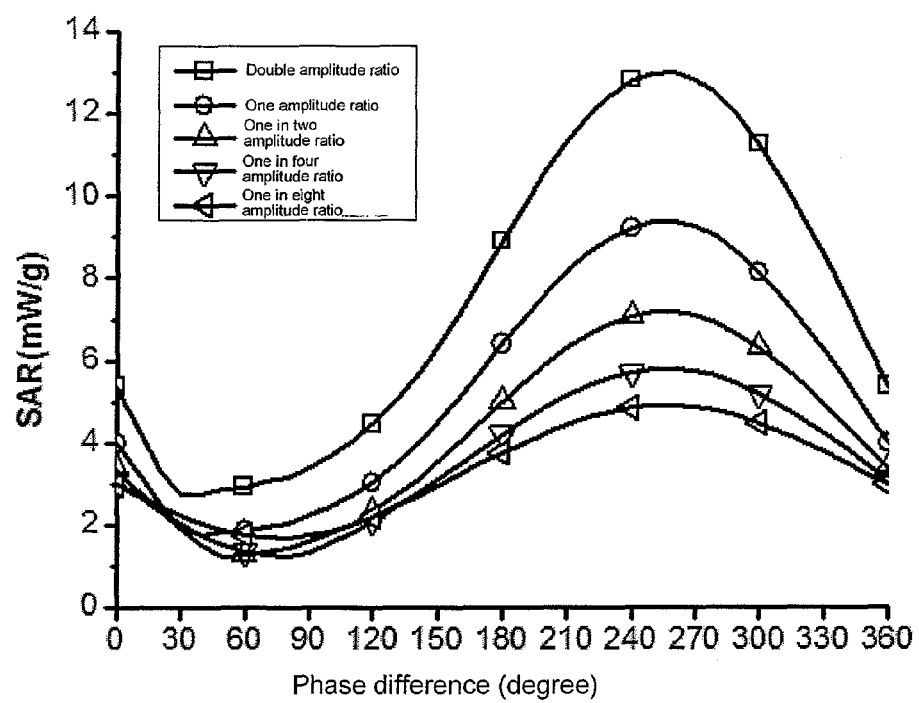
Figure 5D:
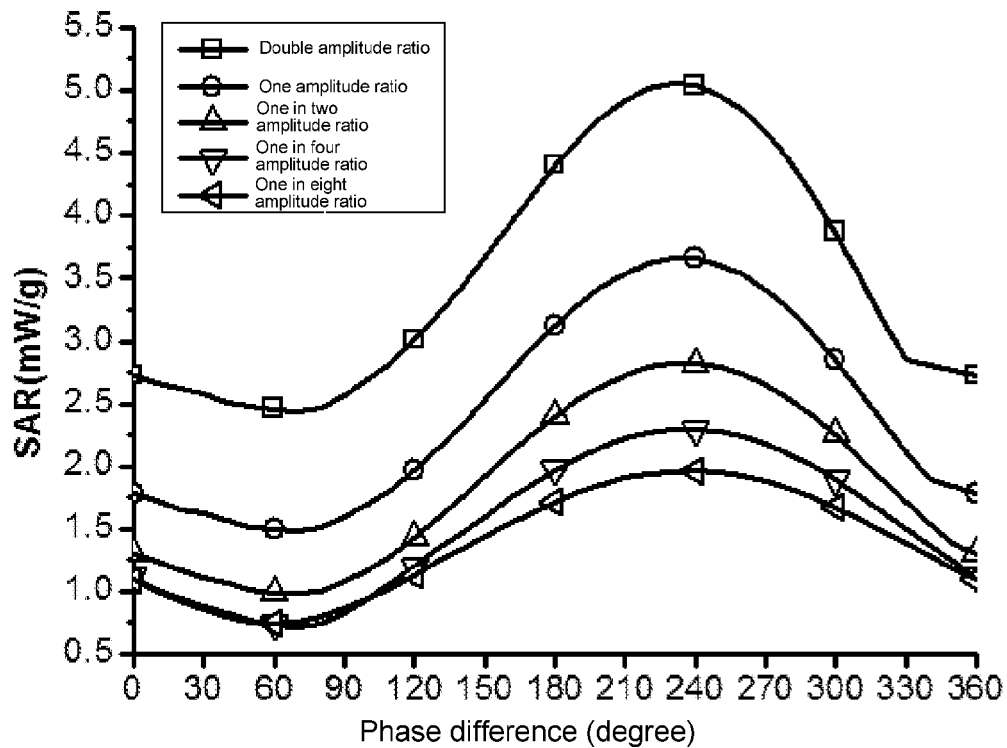

In the embodiment, FIG. 5*a* is a tendency chart of the SAR peak value of the plane P1 varying with the amplitude ratio and the phase difference between the coupling signal and the communication signal, and FIG. 5*b* is a tendency chart of the SAR peak value of the plane P2 varying with the amplitude ratio and the phase difference between the coupling signal and the communication signal. For the planes P1 and P2, when the phase difference is near 90° and the amplitude ratio of energy is in a range from 1/8 to 1/2, the SAR peak value of the wireless terminal is smallest. FIG. 5*c* is a tendency chart of the SAR peak value of the plane P3 varying with the amplitude ratio and the phase difference between the coupling signal and the communication signal, and FIG. 5*d* is a tendency chart of the SAR peak value of the plane P4 varying with the amplitude ratio and the phase difference between the coupling signal and the communication signal. For the planes P3 and P4, when the phase difference is near 60° and the amplitude ratio of energy is in a range from 1/8 to 1/2, the SAR peak value of the wireless terminal is smallest. Therefore, the SAR peak value can be reduced effectively through selecting an appropriate amplitude ratio and phase difference according to the orientation in which the human body approaches.

Figure 6:
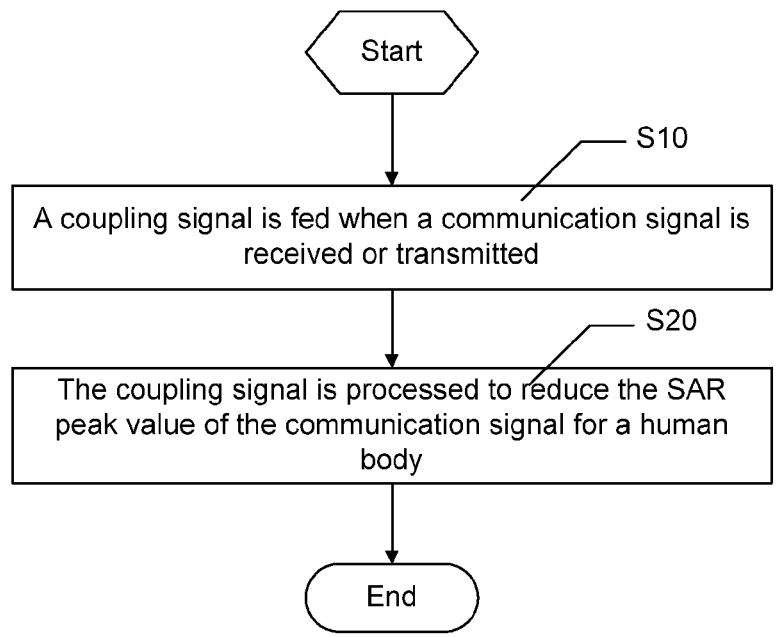
FIG. 6 is a flowchart of a method for reducing an SAR peak value by using a wireless terminal according to an embodiment of the disclosure.

As shown in FIG. 6, the FIG. 6 is a flowchart of a method for reducing an SAR peak value by using a wireless terminal according to an embodiment of the disclosure. The method of the embodiment includes:

S10: A coupling signal is fed when a communication signal is received or transmitted.

S20: The coupling signal is processed to reduce the SAR peak value of the communication signal for a human body.

In the embodiment, in order to reduce the near-field radiation generated by the communication signal to the human body, the coupling signal is fed in the wireless terminal, the electromagnetic wave energy radiated by the communication signal to the human body is changed by utilizing the superposition of the coupling signal and the communication signal, and the electromagnetic wave energy radiating to the human body can be minimized by processing the coupling signal, so as to reduce the SAR peak value of the electromagnetic radiation absorbed by the human body. In addition, in the embodiment, since the coupling signal is adjusted, not only the SAR peak value is reduced in the orientation near the human body, but also the radiation of the antenna is mainly concentrated in a non-human-body direction due to the change of the radiation near-field distribution of the antenna, so as to improve the radiation gain of the antenna and then improve the communication quality.

Figure 7:
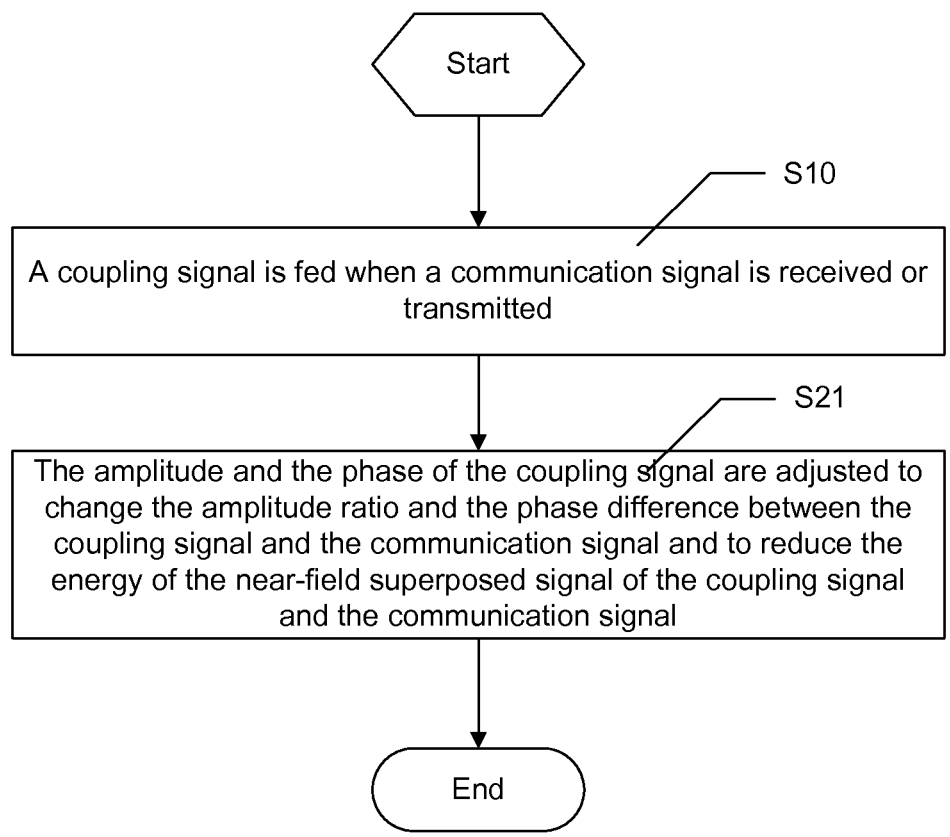
FIG. 7 is a flowchart of a step of processing a coupling signal in the method for reducing an SAR peak value by using a wireless terminal shown in the FIG. 6.

As shown in FIG. 7, FIG. 7 is a flowchart of a step of processing coupling signal in the method for reducing an SAR peak value by using a wireless terminal shown in the FIG. 6. Step S20 in the method embodiment specifically includes:

S21: The amplitude and the phase of the coupling signal are adjusted to change the amplitude ratio and the phase difference between the coupling signal and the communication signal and to reduce the energy of the near-field superposed signal of the coupling signal and the communication signal.

In the embodiment, when the amplitude and the phase of the coupling signal are not consistent with those of the communication signal, the energy of the superposed signal in all orientations of the near field may be changed due to the superposition of the coupling signal and the communication signal. The amplitude and phase of the coupling signal are adjusted to adjust the amplitude ratio and the phase difference between the coupling signal and the communication signal, and the amplitude ratio and the phase difference corresponding to a minimum value of the energy of the superposed signal in all orientations of the wireless terminal may be found. An appropriate amplitude ratio and an appropriate phase difference are selected according to a specific orientation of the human body close to the wireless terminal, in order to minimize the energy of the near-field superposed signal radiating to the human body in the orientation and then reduce the SAR peak value.

Figure 8:
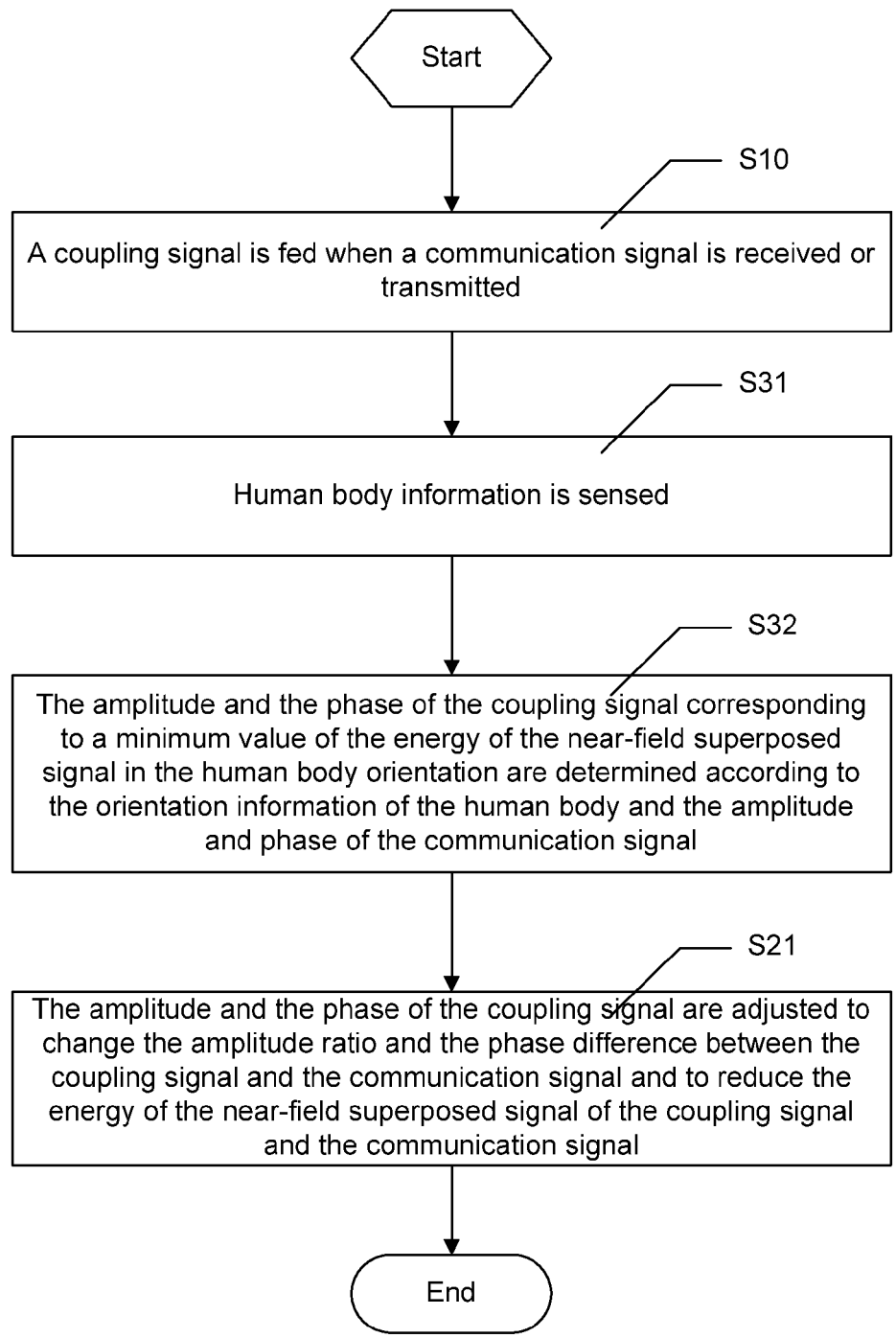
FIG. 8 is a flowchart of a method for reducing an SAR peak value by using a wireless terminal according to a further embodiment of the disclosure, and the method embodiment includes the step of sensing human body information.

As shown in FIG. 8, FIG. 8 is a flowchart of a method for reducing an SAR peak value by using a wireless terminal according to a further embodiment of the disclosure. The method embodiment includes the step of sensing human body information. Before S21, the method further includes:

S31: Human body orientation information is sensed.

S32: The amplitude and the phase of the coupling signal corresponding to a minimum value of the energy of the near-field superposed signal in the human body orientation are determined according to the orientation information of the human body and the amplitude and phase of the communication signal.

In the embodiment, when the human body is close to one side of the wireless terminal, a sensor built into the wireless terminal may sense a human body approaching the wireless terminal from the side, and generate orientation information of the human body. The wireless terminal determines, according to the specific orientation information of the human body with respect to the wireless terminal, the amplitude ratio and the phase difference between the coupling signal and the communication signal corresponding to a minimum value of the energy of the near-field superposed signal in the orientation, and determines the amplitude and the phase of the fed coupling signal through the current amplitude and phase of the communication signal, so as to implement real-time dynamic adjustment of the radiation near-field and reduce the SAR value. In addition, in order to control cost, the energy of the near-field superposed signal in all orientations can be considered comprehensively through the previous measurement and calibration process, to acquire an appropriate amplitude ratio and phase difference. A fixed amplitude and phase of the coupling signal is preset on each feeding line, then the step of sensing the orientation of the human body and the step of processing the amplitude and the phase in real time are omitted, thereby improving the work efficiency of reducing the SAR peak value.

The above are only preferable embodiments of the disclosure, and are not intended to limit the scope of protection of the claims of the disclosure. Any equivalent structure or flow transformation made with reference to the specification and drawings of the disclosure, or direct or indirect applications thereof to other related technical field shall fall within the scope of protection of the claims of the disclosure similarly.

INDUSTRIAL APPLICABILITY

In the disclosure, the energy of a superposed signal in a human body orientation is reduced by arranging a second antenna in a mobile phone and superposing a coupling signal with a communication signal, so as to reduce an SAR peak value effectively. A radiation near-field distribution of an antenna is changed to concentrate the radiation of the antenna in a non-human-body direction, thus improving a radiation gain of the antenna.

The invention claimed is:

1. A wireless terminal with a reduced Specific Absorption Rate (SAR) peak value, which comprises a first antenna configured to receive or transmit a communication signal, wherein the wireless terminal further comprises:
    a second antenna, configured to feed a coupling signal when the first antenna receives or transmits the communication signal; and
    a signal processing module, configured to process the coupling signal to reduce an SAR peak value of the communication signal for a human body; and
    a human body sensor, configured to sense and output orientation information of the human body;
    wherein the signal processing module is further configured to:
    receive the orientation information of the human body,
    determine, according to the orientation information of the human body and an amplitude and a phase of the communication signal, the amplitude and the phase of the coupling signal corresponding to a minimum value of the energy of the near-field superposed signal in the human body orientation, and
    adjust the coupling signal according to the determined amplitude and phase of the coupling signal.

2. The wireless terminal with a reduced SAR peak value according to claim 1, wherein the signal processing module is further configured to:
    adjust an amplitude and a phase of the coupling signal, so as to change an amplitude ratio and a phase difference between the coupling signal and the communication signal and to reduce energy of a near-field superposed signal of the coupling signal and the communication signal.

3. The wireless terminal with a reduced SAR peak value according to claim 2, wherein the second antenna comprises:
    a second feed source, configured to feed the coupling signal; and
    a second radiator, configured to receive or transmit the coupling signal.

4. The wireless terminal with a reduced SAR peak value according to claim 3, wherein the second radiator is a tortuous conducting line or a conducting strip with multiple branches.

5. The wireless terminal with a reduced SAR peak value according to claim 4, wherein the human body sensor is an optical sensor, a thermal sensor, a gravity sensor or a proximity sensor, and the human body sensor includes multiple human body sensors distributed on each inner surface of the wireless terminal.

6. The wireless terminal with a reduced SAR peak value according to claim 1, wherein the second antenna is further configured to feed the communication signal, and receive or transmit the communication signal.

7. A method for reducing a Specific Absorption Rate (SAR) peak value by using a wireless terminal, comprising:

feeding a coupling signal when a communication signal is received or transmitted; and processing the coupling signal to reduce an SAR peak value of the communication signal for a human body;

wherein the step of processing the coupling signal to reduce an SAR peak value of the communication signal for a human body comprises:

adjusting an amplitude and a phase of the coupling signal, so as to change an amplitude ratio and a phase difference between the coupling signal and the communication signal and to reduce energy of a near-field superposed signal of the coupling signal and the communication signal; and the method further comprises: before the amplitude and the phase of the coupling signal are adjusted, sensing orientation information of the human body; and determining, according to the orientation information of the human body and an amplitude and a phase of the communication signal, the amplitude and the phase of the coupling signal corresponding to a minimum value of the energy of the near-field superposed signal in the human body orientation.

\* \* \* \* \*